United States Patent
Baumann et al.

(10) Patent No.: US 9,376,976 B2
(45) Date of Patent: Jun. 28, 2016

(54) METHOD AND DEVICE FOR OPERATING AN INTERNAL COMBUSTION ENGINE

(75) Inventors: Thomas Baumann, Kornwestheim (DE); Udo Schulz, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 374 days.

(21) Appl. No.: 14/232,320

(22) PCT Filed: May 16, 2012

(86) PCT No.: PCT/EP2012/059101
§ 371 (c)(1),
(2), (4) Date: Jan. 13, 2014

(87) PCT Pub. No.: WO2013/007428
PCT Pub. Date: Jan. 17, 2013

(65) Prior Publication Data
US 2014/0136078 A1  May 15, 2014

(30) Foreign Application Priority Data

Jul. 11, 2011 (DE) .......................... 10 2011 078 930

(51) Int. Cl.
*F02D 41/14* (2006.01)
*F02D 41/00* (2006.01)
(Continued)

(52) U.S. Cl.
CPC .............. *F02D 41/14* (2013.01); *B60W 10/06* (2013.01); *B60W 10/08* (2013.01); *B60W 20/50* (2013.01);
(Continued)

(58) Field of Classification Search
CPC ... G01M 15/044; G01M 15/08; G01M 15/10; G01M 15/102; G01M 15/104; F02D 2200/1002; F02D 2200/1004; F02D 2700/05; F02D 2700/052; F02D 2700/054; F02D 2700/058; F02D 2700/07; F02D 41/14; F02D 41/1401; F02D 14/1423; F02D 2041/1436
USPC ........ 123/434; 701/107, 114–115; 73/114.72, 73/114.15; 903/930
See application file for complete search history.

(56) References Cited

U.S. PATENT DOCUMENTS

| | | | | | |
|---|---|---|---|---|---|
| 4,448,063 | A | * | 5/1984 | Mudge | G01M 15/042 73/114.56 |
| 5,355,713 | A | * | 10/1994 | Scourtes | G01M 15/106 73/114.76 |

(Continued)

FOREIGN PATENT DOCUMENTS

| | | |
|---|---|---|
| CN | 102052173 A | 5/2011 |
| DE | 10116749 | 10/2001 |

(Continued)

OTHER PUBLICATIONS

International Search Report for Application No. PCT/EP2012/059101 dated Jul. 12, 2012 (2 pages).

*Primary Examiner* — Thomas Moulis
(74) *Attorney, Agent, or Firm* — Michael Best & Friedrich LLP

(57) ABSTRACT

The invention relates to a method for operating a drive device (1), which for the purpose of providing a driving torque comprises an internal combustion engine having a plurality of cylinders (10, 11, 12, 13) that, during normal operation, supply a respective torque contribution, and at least one electric motor (3) operatively connected to said engine. To this end, in a diagnostic mode a cylinder-selective measurement of at least one characteristic operating variable is carried out, for which purpose in the diagnostic mode only the cylinder (10, 11, 12, 13) to be measured is operated and the torque contributions of the remaining cylinders (10, 11, 12, 13) are simulated by the electric motor (3).

15 Claims, 1 Drawing Sheet

(51) Int. Cl.

| | |
|---|---|
| *F02D 41/22* | (2006.01) |
| *B60W 10/06* | (2006.01) |
| *B60W 10/08* | (2006.01) |
| *B60W 20/00* | (2016.01) |
| *F02D 41/24* | (2006.01) |
| *F02P 19/02* | (2006.01) |
| *B60K 6/48* | (2007.10) |
| *B60W 50/02* | (2012.01) |

(52) U.S. Cl.
CPC ........ *F02D 41/0087* (2013.01); *F02D 41/1497* (2013.01); *F02D 41/22* (2013.01); *B60K 2006/4825* (2013.01); *B60W 2050/021* (2013.01); *B60W 2510/244* (2013.01); *F02D 41/247* (2013.01); *F02D 2200/1004* (2013.01); *F02D 2250/24* (2013.01); *F02P 19/027* (2013.01); *Y02T 10/6252* (2013.01); *Y02T 10/6286* (2013.01)

(56) References Cited

U.S. PATENT DOCUMENTS

| | | | | |
|---|---|---|---|---|
| 5,417,109 A | * | 5/1995 | Scourtes | G01M 15/09 73/114.01 |
| 6,522,024 B1 | * | 2/2003 | Takaoka | B60K 6/445 180/65.235 |
| 6,889,133 B2 | * | 5/2005 | Daniel | F02B 75/22 701/114 |
| 6,910,369 B2 | * | 6/2005 | Okuda | G01M 15/102 73/114.28 |
| 8,375,775 B2 | * | 2/2013 | Lilienkamp | G01M 15/042 73/114.15 |
| 2001/0047681 A1 | * | 12/2001 | Burkardt | G01M 15/042 73/49.7 |
| 2003/0150258 A1 | * | 8/2003 | Moskwa | G01M 15/044 73/118.02 |
| 2007/0101965 A1 | | 5/2007 | Asahara | |
| 2014/0379206 A1 | * | 12/2014 | Martin | G01M 15/02 701/32.8 |

FOREIGN PATENT DOCUMENTS

| | | |
|---|---|---|
| EP | 1143134 | 10/2001 |
| EP | 1849979 | 10/2007 |
| JP | H11182275 | 7/1999 |
| JP | 2006009664 A | 1/2006 |
| JP | 2007290663 | 11/2007 |
| JP | 2010215183 | 9/2010 |
| WO | 01/59282 | 8/2001 |
| WO | 2008/059337 | 5/2008 |

* cited by examiner

METHOD AND DEVICE FOR OPERATING AN INTERNAL COMBUSTION ENGINE

BACKGROUND OF THE INVENTION

The invention relates to a method for operating a drive device that for the purpose of providing a driving torque comprises an internal combustion engine, which comprises a plurality of cylinders that during normal operation in each case supply a torque contribution, and at least one electric motor operatively connected to said engine.

In addition, the invention relates to a computer program product having a program code that is stored on a machine-readable storage medium for implementing the method mentioned above.

Methods of the type mentioned in the introduction are known from the prior art. By way of example, the unexamined German application DE 101 16 749 A1 illustrates a drive device that comprises an internal combustion engine and an electric motor that are controlled for the purpose of providing a driving torque, so that during normal operation each of the cylinders of the internal combustion engine supplies a torque contribution. Selected cylinders in the internal combustion engine are activated or deactivated in a separate operating mode for the purpose of providing a desired torque and achieving optimal performance and fuel economy.

It is additionally disclosed in the unexamined German application WO 01/59282 A1, in a diagnostic mode to perform a cylinder-individual measurement of torques or rather torque contributions output by individual cylinders and/or to measure combustion chamber pressures of individual cylinders as a characteristic operating variable, wherein the differences in torque delivered by individual cylinders are determined indirectly on the basis of an evaluation of the running smoothness of the internal combustion engine with the aid of a crankshaft rotation rate sensor.

A similar method is disclosed in the patent application EP 1 849 979 A2, in which a cylinder-individual fuel/fresh air mixture ratio is measured in the exhaust gas.

SUMMARY OF THE INVENTION

The method in accordance with the invention is characterized in that in a diagnostic mode at least one characteristic operating variable is measured on a selected cylinder, for which purpose in the diagnostic mode only the cylinder to be measured is in operation and the torque contributions of the remaining cylinders are simulated by way of the electric motor. The method in accordance with the invention has the advantage that the driving torque is on the whole preserved, so that a driver of a vehicle comprising the drive device does not feel any difference, while at the same time only the cylinder to be measured is in operation and as a consequence its characteristic operating variable is ascertained in a manner that is independent of the remaining cylinders and the measuring result cannot be corrupted by way of other cylinders of the internal combustion engine. By virtue of the fact that the torque contributions of the remaining cylinders are simulated by way of the electric motor, the drive device in the diagnostic mode acts in relation to the driving torque just as in the normal operating mode. Thus, the driving torque of the drive device can also be increased or decreased by way of example during the diagnostic mode. It is thereby in particular possible also to perform the cylinder-individual measurement of the characteristic operating variable by providing only a single sensor, which is provided in the common exhaust gas tract of the cylinders. Naturally, it is also feasible to divide the cylinders into two or more banks, each bank being allocated an exhaust gas tract that comprises a corresponding sensor arranged therein.

It is particularly preferred that the diagnostic mode is adjusted and/or implemented in dependence upon a torque that can be currently generated by the electric motor. As a consequence, it is ensured that the electric motor can also at least for a minimum time frame always simulate the torque contributions of the remaining cylinders. If the electric motor is not in the position to simulate the torque contributions of the remaining cylinders, the diagnostic mode is disabled, as the consequences would otherwise be a sudden drop in the torque of the drive device. The diagnostic mode is preferably adjusted or implemented in dependence upon a prevailing charge state of an energy storage device that is dedicated to the electric motor. It is provided in particular that, if the prevailing charge state of the energy storage device falls below a threshold value that can be predefined, the diagnostic mode is disabled.

In accordance with an advantageous further embodiment of the invention it is provided that the diagnostic mode occurs until the characteristic operating variable of the cylinder to be measured has been ascertained. As a consequence, the torque contributions of the remaining cylinders are simulated by way of the electric motor until the characteristic operating variable of the cylinder to be measured is reliably and precisely ascertained. Additionally, it is in particular provided, that this time period is limited in dependence upon the prevailing charge state of the electric motor, as is described above, so as to avoid an overload of the energy storage device. It is preferred that the diagnostic mode occurs until the exhaust gas mixture of the remaining cylinders is discharged and as a consequence only the exhaust gas from the cylinder to be measured is available.

In accordance with a preferred further embodiment of the invention it is provided that in the diagnostic mode the characteristic operating variable of all cylinders is measured one after the other. As a consequence, one cylinder is always operating, while the torque contributions of the remaining cylinders are simulated by way of the electric motor. Finally, one of the other cylinders generates its torque contribution, while the remaining cylinders, in other words also the cylinder that previously delivered a torque, are deactivated and simulated by way of the electric motor. As a consequence, the characteristic operating variable of each of the cylinders is precisely measured and/or determined.

In accordance with an alternative embodiment it is provided, that in the diagnostic mode only a suspect cylinder is measured and in particular the diagnostic mode is subsequently terminated. The term 'suspect cylinder' is understood to mean here a cylinder of the internal combustion engine, which cylinder is suspected of not producing a desired value with respect to the operating variable and/or not performing sufficiently well. The suspect cylinder can be measured by way of example on the basis of a cylinder-selective measurement in accordance with a method from the prior art and subsequently confirmed by way of the method in accordance with the invention and/or be measured in detail or rather with a high level of accuracy.

Furthermore, it is preferably provided that inlet and/or outlet valves of the remaining cylinders, in other words the deactivated cylinders, are closed in the diagnostic mode in order to measure the cylinder-individual gas exchange cycle of the cylinder in operation. This is naturally only then possible, if the drive device or rather the internal combustion engine is equipped with a corresponding valve gear that renders it possible to actuate valves individually. If the inlet and outlet valves of the remaining cylinders are closed, air is only conveyed through the cylinder to be measured, so that the influence of air can be measured on an individual cylinder.

It is preferably provided that while the cylinder to be measured generates its torque contribution, the electric motor generates a supporting or counteracting torque. A higher or lower load on the cylinder to be measured can be advantageous in order to measure particular characteristic operating variables. However, in order to keep the overall driving torque constant, the electric motor behaves in a supporting or counteracting manner, while the cylinder generates a lower or higher torque contribution in relation to the actual desired contribution.

It is particularly preferred that in the diagnostic mode the cylinder to be measured generates an increased torque or is filled and/or supplied with an increased amount of fuel, as a consequence of which the characteristic operating variable can be more easily and/or more clearly ascertained. The electric motor—as already mentioned—preferably counteracts this in order to compensate for the additional torque.

The device in accordance with the invention is characterized by way of a specially arranged control device that comprises means for implementing the method, as described above. The control device is allocated preferably at least one sensor for ascertaining the characteristic operating variable and also connections that render it possible for the control device to control the internal combustion engine and the electric motor as described above in order to render it possible to perform a cylinder-individual measurement of the operating variable.

The computer program product in accordance with the invention is characterized by a program code for implementing the method described above if the program is performed on a computer.

BRIEF DESCRIPTION OF THE DRAWINGS

The invention is further explained hereinunder with reference to the drawing, in which.

DETAILED DESCRIPTION

Figure 1:
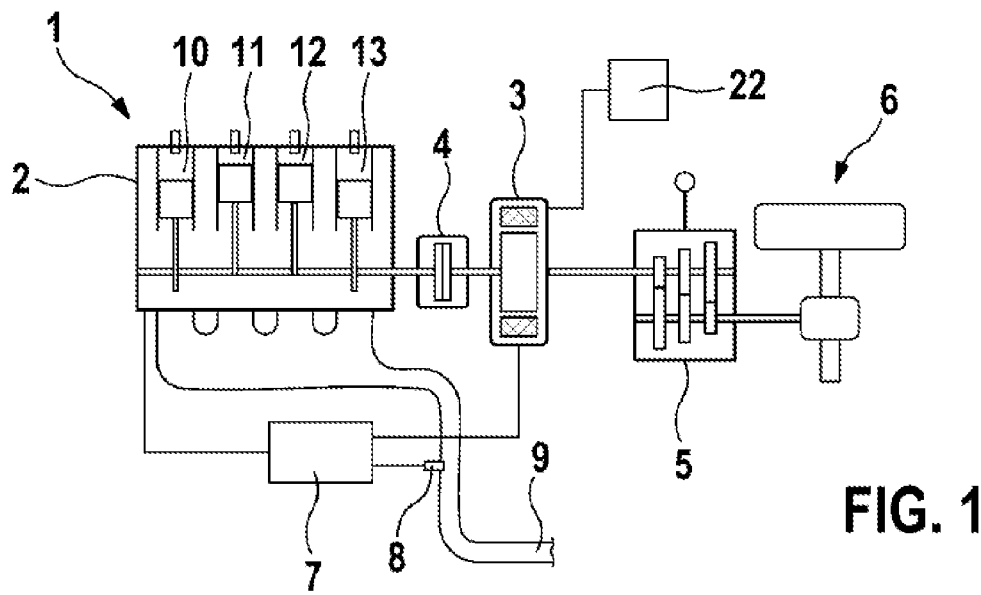
FIG. 1 illustrates a drive device in a simplified illustration and FIG. 2 illustrates a block diagram of an advantageous method for operating a drive device.

FIG. 1 shows a drive device 1 for a motor vehicle, which drive device comprises an internal combustion engine 2 and an electric motor 3. The internal combustion engine 2 can be operatively connected to the electric motor 3 by way of a coupling 4 that can be actuated. The electric motor 3 is further connected on its output side to a gear box 5, which can be embodied as an automatic gear box or a manual gear box. The gear box 5 is connected on its output side to a drive shaft 6, only implied, of the motor vehicle, not further illustrated. The drive device 1 further comprises a device 7 that is at least connected to the internal combustion engine 2 and the electric motor 3, in order to control them. In addition, the device 7 is connected to a sensor 8 that is arranged in an exhaust gas tract 9 of the internal combustion engine 2, in order to ascertain at least one particular operating variable of the exhaust gas, for example to detect the oxygen content of the exhaust gas.

The internal combustion engine 2 comprises a plurality of cylinders 10, 11, 12 and 13, the outlet ducts of which issue into the common exhaust gas tract 9, so that all exhaust gases of the cylinders 10-13 are conveyed past the sensor 8.

Figure 2:
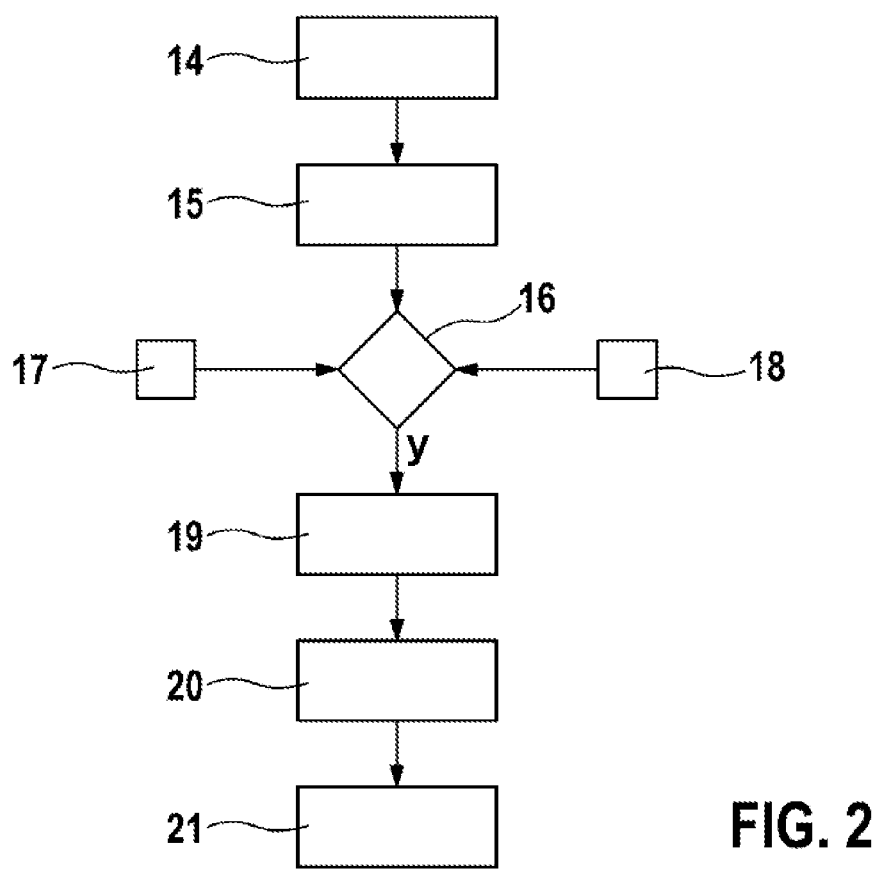

A method for operating the drive device 1 is described hereinunder with reference to FIG. 2, which method is in particular implemented by the device 7 that for this purpose comprises a specially arranged control device that comprises corresponding means for implementing the method.

In a first step 14, the drive device 1 is started up and preferably set to normal operation. The term 'normal operation' is understood to mean here an operation in which all the cylinders 10-13 of the internal combustion engine 2 generate a torque contribution that influences the drive shaft 6 when the coupling 4 is closed.

In the following step 15, a diagnostic mode is activated, in which a cylinder-selective measurement at least of one characteristic operating variable is performed by way of the sensor 8. In particular, it is provided that a fuel-air ratio is measured on a selected cylinder by way of the sensor 8 that is embodied as a Lambda sensor. A method known from the prior art is preferably used for this purpose, in which method in dependence upon the angle of rotation of the crankshaft of the combustion engine 1, which angle of rotation is ascertained by way of a crankshaft sensor, the point in time is determined at which the exhaust gas of a particular cylinder of the cylinders 10 to 12 flows past the sensor 8. If it is established that one of the cylinders delivers an implausible or unexpected value of the ascertained operating variable, the diagnostic method is further implemented in an advantageous manner as follows:

Initially in a decision step 16, the prevailing charge condition of an electric energy storage device 22 that is allocated to the electric motor 3, said charge condition having been ascertained previously during a step 17, is compared with a threshold value that has been predetermined previously by way of example during the application of the drive device. If the prevailing charge condition lies below the threshold value, the diagnostic program is either aborted or suspended until the charge condition reaches a value that lies above the threshold value. This can by way of example be achieved by operating the drive device in a generating mode if the electric motor 3 is driven by way of the internal combustion engine 2. In addition or as an alternative thereto, the operating range of the internal combustion engine 2 is tested in a step 18 and a decision is made as to whether the electric motor 3 can simulate the absent torque contributions of the remaining cylinders 11-13, in other words whether the power output of the electric motor 3 in the prevailing present operating range of the drive device 1 suffices in order to provide a correspondingly high torque.

If the value of the prevailing charge condition lies above the predefined threshold, the method will proceed (y) to a further step 19, in which the internal combustion engine 2 is controlled in such a manner that the cylinder that was considered in step 15 to be suspect, for example cylinder 10, is controlled to supply its torque contribution, while the remaining cylinders 11 to 13 are deactivated, in other words are no longer used or rather energized. The electric motor 3 is simultaneously controlled in such a manner, that it simulates the torque contributions of the remaining cylinders 11-13. In other words, the electric motor 3 simulates the absent torque contributions of the cylinders 11, 12 and 13, so that the same driving torque prevails at the drive shaft 6 and in particular the driver does not notice any difference in the driving characteristics, apart from maybe an acoustic difference. It is achieved that only exhaust gas of the cylinder 10 to be measured is conveyed through the exhaust gas tract 9. It is preferred that the remaining cylinders 11 to 13 are not supplied with fuel and it is particularly preferred if the inlet and outlet valves of the remaining cylinders 11-13 are closed, so that no air is pumped through the cylinders 11-13 and mixed with the exhaust gas of the cylinder 10. Subsequently, the sensor 8 in a step 20 only detects the exhaust gas leaving the cylinder 10, as a consequence of which the influence of the cylinder 10 on the characteristic operating variable to be measured is ascertained extremely precisely.

The diagnostic mode is maintained until the characteristic operating variable of the cylinder 10 has been precisely ascertained, however at least until the exhaust gas mixture of the remaining cylinders 11 to 13 has left the exhaust gas tract 9 or rather has been discharged.

As an alternative to the Lambda value, also the exhaust gas temperature, the exhaust gas pressure or also the torque contribution of the cylinder 10 to be measured can also be measured or rather ascertained. It is thus rendered possible to make cylinder-individual corrections in particular in relation to the amount of fuel injected and/or the fuel injection timing, the ignition timing or the opening times and/or strokes of the inlet and/or outlet valves of the respective cylinder. It is only necessary for this purpose to provide corresponding sensors or rather means that render it possible to ascertain the respective values. Each of the values can be ascertained in a reliable manner for an individual cylinder by way of the method that is described above and is implemented by the device 7.

The rotation rate of the internal combustion engine and preferably the crankshaft angle are ascertained in an expedient manner, and taken into consideration when controlling the electric motor 3, in order to be able to accurately simulate the absent torque contributions. For this purpose, by way of example the internal combustion engine rotation rate signal is supplied directly to a control device of the electric motor 3.

If one or more characteristic operating variables is/are reliably ascertained and where necessary corresponding corrections are made, the diagnostic program or rather the diagnostic mode is terminated in a final step 21.

The cylinder-selective measurement for one cylinder after the other is preferably performed in the diagnostic mode, so that one cylinder is always in operation and the torque contributions of the remaining cylinders are adjusted by way of the electric motor 3, wherein only the cylinder to be measured is supplied with fuel and where necessary ignited. In accordance with an exemplary embodiment not illustrated here, step 15 is omitted, wherein all cylinders of the internal combustion engine 2 and/or the values of all cylinders 10-13 are measured one after the other according to the steps 19 and 20.

It is possible for example to establish by way of the advantageous method whether the inlet and/or outlet valves open or close correctly, whether the heat output of the spark plugs is sufficient, in particular during warming-up, and/or whether the amount of fuel being injected by the injector lies within predefined tolerance limits.

It is preferred that the at least one sensor 8, in particular in the described embodiment as a Lambda sensor, is arranged in the exhaust gas tract 9 in direct proximity to the junction and/or mixing point of the cylinder-individual gases in order to minimize the running time effects and mixing effects. As previously mentioned, the point in time at which the measurement is performed is important and is preferably performed in a synchronized or chronologically synchronized manner by way of the crankshaft angle and/or inlet and outlet valve positions, by way of example every millisecond. If the measurement values of different sensors in the case of a different installation site in the exhaust gas tract 9 are calculated or brought into relationship with one another, then the running times in the exhaust gas tract can be taken into consideration by means of modeling or rather likewise ascertained.

For a more accurate cylinder-individual diagnosis or rather measurement, it is also feasible to determine a model from engine input and/or output signals and to compare said model with desired models. It is also possible using the electric motor 3 to generate a counteracting or co-running or rather supporting torque, while the cylinder to be measured delivers its torque contribution. Thus, it is possible by way of example in order to obtain a measurable signal to supply the cylinder to be measured with a surplus amount of injected fuel and to compensate by way of the electric motor 3 for the surplus amount of torque that is not required for the overall drive output.

In order during the mixing operation, in other words if the internal combustion engine 2 and the electric motor 3 and in particular if a partial load requirement exists, to operate the internal combustion engine 2 in the optimal combustion and optimal consumption state and to optimize the electromotive cruising range, preferably not all the cylinders are in operation driving the internal combustion engine, so that only selected cylinders generate a torque contribution and the remaining cylinders (at least one) are simulated and/or replaced by way of the electric motor 3.

The advantageous method is preferably used when performing the diagnosis in a workshop, where by way of example by involving external exhaust gas analysis devices and further measuring devices, which by way of example also comprise acoustic sensors, the cylinder-individual diagnosis possibilities are further improved. It is preferred that the electric motor 3 drives the internal combustion engine 2 to a diagnosis operating point, so that a cylinder-individual diagnosis is rendered advantageously possible even during the start and/or warm up phase. The influence of the driver and the driving cycle of the real driving operation are preferably masked here. Desired operating conditions for the cylinder-individual diagnosis of the internal combustion engine 2, which conditions are laborious to achieve in the normal driving operation can be illustrated here in a simpler manner.

The following diagnostic modes in particular are possible by way of the above-described method:
  Zero quantity calibration (internal combustion engine in the coasting mode) of the injectors, wherein the electric motor 3 drives the internal combustion 2 engine into a user-defined rotation rate range
  Cylinder compression test
  Cylinder-individual leak test
  Cylinder-individual exhaust gas test
  Cylinder-individual torque contribution
  Comparison of the amounts of injected fuel
  Cylinder-individual ignition diagnosis
  Updating balanced condition values, for example a friction loss characteristic diagram of the internal combustion engine 2.

The invention is naturally not limited to a drive device, where the internal combustion engine and electric motor are mutually connected as illustrated in FIG. 1. Naturally, the internal combustion engine 2 and the electric motor 3 can also be connected to one another for example in a parallel manner. It is also feasible that the internal combustion engine 2 is operatively connected to a drive shaft and that the electric motor 3 is operatively connected to a different drive shaft of the same motor vehicle.

The invention claimed is:
1. A method for operating a drive device (1) that for the purpose of providing a driving torque comprises an internal combustion engine (2), which comprises a plurality of cylinders (10, 11, 12, 13) that during normal operation in each case supply a torque contribution, and at least one electric motor (3) that is operatively connected to said engine, the method comprising:

performing, in a diagnostic mode, a cylinder-selective measurement of at least one characteristic operating variable;

wherein only the cylinder (10, 11, 12, 13) to be measured is in operation and the torque contributions of the remaining cylinders (10, 11, 12, 13) are simulated by way of the electric motor (3).

2. The method as claimed in claim 1, characterized in that the diagnostic mode is adjusted in dependence upon a torque that can currently be generated by way of the electric motor (3).

3. The method as claimed in claim 1, characterized in that the diagnostic mode occurs until the characteristic operating variable of the cylinder to be measured (10, 11, 12, 13) has been detected.

4. The method as claimed in claim 1, characterized in that in the diagnostic mode the characteristic operating variable of all the cylinders (10, 11, 12, 13) is measured one after the other.

5. The method as claimed in claim 1, characterized in that in the diagnostic mode only a suspect cylinder (10, 11, 12, 13) is measured.

6. The method as claimed in claim 1, characterized in that valves of the remaining cylinders (10, 11, 12, 13) are closed in the diagnostic mode in order to measure the cylinder-individual gas exchange.

7. The method as claimed in claim 1, characterized in that, while the cylinder (10, 11, 12, 13) to be measured supplies its torque contribution, the electric motor (3) generates a supporting or counteracting torque.

8. The method as claimed in claim 1, characterized in that in the diagnostic mode the cylinder (10, 11, 12, 13) to be measured generates an increased amount of torque or is filled/supplied with an increased amount of fuel.

9. A device (7) for operating a drive device (1), comprises a specially arranged control device for implementing the method as claimed in claim 1.

10. A computer program product having a program code that is stored on a non-transitory machine-readable storage medium for implementing the method as claimed in claim 1, if the program is performed on a computer.

11. The method as claimed in claim 1, characterized in that the diagnostic mode is adjusted in dependence upon a prevailing charge state of an energy storage device (22) that is allocated to the electric motor (3).

12. The method as claimed in claim 1, characterized in that the diagnostic mode occurs until the characteristic operating variable of the cylinder to be measured (10, 11, 12, 13) has been detected, and until the exhaust gas mixture at least of the remaining cylinders (10, 11, 12, 13) is discharged.

13. The method as claimed in claim 1, characterized in that intake valves of the remaining cylinders (10, 11, 12, 13) are closed in the diagnostic mode in order to measure the cylinder-individual gas exchange.

14. The method as claimed in claim 1, characterized in that exhaust valves of the remaining cylinders (10, 11, 12, 13) are closed in the diagnostic mode in order to measure the cylinder-individual gas exchange.

15. The method as claimed in claim 1, characterized in that intake and exhaust valves of the remaining cylinders (10, 11, 12, 13) are closed in the diagnostic mode in order to measure the cylinder-individual gas exchange.

* * * * *